United States Patent [19]

Holman, Jr.

[11] Patent Number: 4,959,777
[45] Date of Patent: Sep. 25, 1990

[54] WRITE-SHARED CACHE CIRCUIT FOR MULTIPROCESSOR SYSTEM

[75] Inventor: Thomas H. Holman, Jr., Austin, Tex.

[73] Assignee: Motorola Computer X, Schaumburg, Ill.

[21] Appl. No.: 78,436

[22] Filed: Jul. 27, 1987

[51] Int. Cl.⁵ .................................. G06F 13/00
[52] U.S. Cl. ............................ 364/200; 364/229.2; 364/243.43; 364/243.44; 364/264.5
[58] Field of Search .................... 364/200, 900

[56] References Cited

U.S. PATENT DOCUMENTS

| | | | |
|---|---|---|---|
| 4,257,095 | 3/1981 | Nadir | 364/200 |
| 4,399,506 | 8/1983 | Evans et al. | 364/200 |
| 4,608,688 | 8/1986 | Hansen et al. | 371/11 |
| 4,669,043 | 5/1987 | Kaplinsky | 364/200 |
| 4,755,930 | 7/1988 | Wilson, Jr. et al. | 364/200 |

Primary Examiner—Gareth D. Shaw
Assistant Examiner—Christine M. Eakman
Attorney, Agent, or Firm—Raymond J. Warren

[57] ABSTRACT

A "write-shared" cache circuit for multiprocessor systems maintains data consistency throughout the system and eliminates non-essential bus accesses by utilizing additional bus lines between caches of the system and by utilizing additional logic in order to enhance the intercache communication. Data is only written through to the system bus when the data is labeled "shared". A write-miss is read only once on the system bus in an "invalidate" cycle, and then it is written only to the requesting cache.

5 Claims, 2 Drawing Sheets

WRITE-SHARED CACHE CIRCUIT FOR MULTIPROCESSOR SYSTEM

TECHNICAL FIELD

This invention relates generally to the area of digital data processing, and, in particular, to an improvement in a cache memory circuit in a multiprocessor system.

BACKGROUND OF THE INVENTION

In a typical bus-based multiprocessor system, the bus band-width is exceeded with a small number of processors due to the necessity of the processors to access memory frequently for instructions and data. To overcome this problem, cache memories may be associated with each processor to act as a buffer between the processors and the system bus. Ideally, the cache is "hit" for a majority of the random access memory (RAM) accesses, and the bus is used only a small percentage of the time.

A problem associated with using cache memories in a multiprocessor system is data consistency. If a processor writes to its cache without notifying the other processors' caches, data will become inconsistent. For example, assume the following: processor "1" reads data block "A" from global RAM and then caches it; then that processor writes to that block, updating only its cache; then processor "2" reads that same block "A" out of global RAM and caches it; processor "2" ends up with a different version of "A" than processor "1". Their caches are inconsistent.

Another way caches could become inconsistent would be if two caches held the same data blocks and only one of the processors updated that block in its cache. Again, a cache consistency problem would arise.

There exist several prior art solutions to the problem of cache consistency. Each of these attempts to solve the problem by writing all or some of the "writes" through to global memory. These write-throughs are used to notify the other caches to invalidate like blocks. However, each of these attempted solutions has one or more problems affecting the cache hit ratio and the bus utilization.

The prior art solutions can be grouped into three categories: (1) write-through, (2) global directory, and (3) write-invalidate.

The write-through scheme is the simplest to implement, but it is also the least effective. With this scheme, all "writes" are directed through the cache to global RAM. All other cache controllers monitor the bus (i.e. "snoop") and invalidate their corresponding entry if any "write" hits in their cache. Any data that would become inconsistent with the resulting "write" is invalidated. Hence, the consistency problem is solved. However, since all "writes" are passed through to global RAM, the bus utilization is substantially increased. Since about 15% of all accesses are "writes", and since all "writes" write-through on the bus as misses, the maximum hit ratio for a cache with this type of scheme is around 85%. Assuming hit ratios of around 75% to 85%, and bus access times twice the cache access times, the bus utilizations for this type of scheme would be around 30% to 40% for each processor. Thus, only two to three processors could use this bus before the bandwidth of the bus would be exceeded. This write-through scheme yields low performance due to high bus contention and is not acceptable in a multiprocessor system having four or more processors.

The global directory scheme uses extra bits for each block in main memory and a memory controller to maintain information on how many processors have cached each block. The major problem with this scheme is that, for large global RAM's, it is expensive. Two extra bits are required for each 32-bit block in global RAM, and memory controller hardware is also required. For this extra expense, there is little, if any, performance increase over the "write-through" scheme.

The "write-invalidate" scheme writes-through only to invalidate those blocks which may reside in other caches. One possible implementation of this scheme would be to perform a write-through on the first "write" to invalidate existing like copies, but subsequent "writes" are written only to the cache. A new problem arises with this variation. When the "write" is only to the cache, that block becomes "dirty" (it is different in the cache than in global RAM). If another processor requests that block, the owning processor must either inhibit the RAM and supply that block itself, or it must halt the requesting processor, write the block back to global RAM, and let the requesting processor request that block again. This snoop requirement is tedious, and it uses multiple bus accesses, but it is necessary to maintain cache consistency.

Other "write-invalidate" variations have evolved to reduce the number of times the first write is required. For example, a routine developed at the University of California at Berkeley introduces the concept of "ownership". The Berkeley scheme includes two type of reads ("read-shared" and "read-for-ownership") and two types of writes ("write-for-invalidation" and "write-without-invalidation") to reduce the bus utilization. The problem with the Berkeley routine is that the first "write" will only be eliminated if data is read and cached as private. If the block could possible by shared, the first write would still be required to invalidate potential like blocks in other caches. Furthermore, a custom complier which can determine when data will be shared or when it will be private is required.

SUMMARY OF THE INVENTION

The present invention pertains to a cache circuit for a multiprocessor system which utilizes extra bus lines and corresponding logic for communication between multiple cache controllers. These extra bus lines allow the elimination of all write-throughs where data is not shared at that time between processors. No special compiler is required to determine if the data can be shared, and, even if that data could be shared but is not at that time, the write-shared routine can still mark it as "private" (or "only").

Thus, it is an object of the present invention to provide a new and improved cache circuit for multiprocessor systems which reduces bus accesses while assuring data consistency.

It is a further object of the present invention to provide a new and improved cache circuit for multiprocessor systems which reduces bus accesses without requiring a special compiler.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the figures.

DESCRIPTION OF THE PREFERRED EMBODIMENTS

Figure 1:
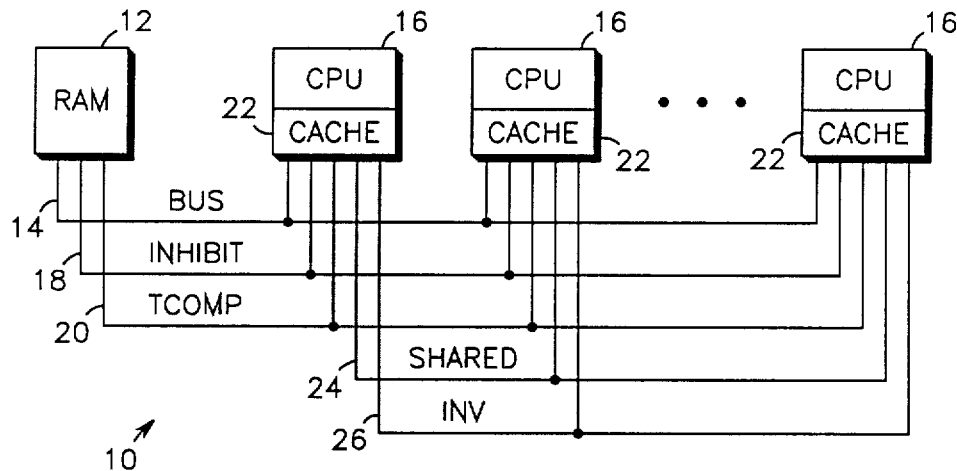
FIG. 1 is a system level block diagram embodying the present invention.

Referring specifically to FIG. 1, a block diagram of a multiprocessor system, designated 10, is illustrated. System 10 has a global RAM 12 connected to a series of CPU's 16 by a system bus 14. Each of the series of CPU's 16 has a cache memory 22 associated with it. Caches 22 are interconnected by both a SHARED bus line 24 and an INV (Invalidate) bus line 26. Caches 22 are connected to RAM 12 by INHIBIT bus line 18 and TCOMP bus line 20.

SHARED bus line 24 is an open collector line that is pulled high when no cache controller (element 30 in FIG. 2) drives it low. As with other write-back schemes the cache controllers associated with each processor monitor (snoop) every access on the bus. If the snoop hits (i.e. some other processor is requesting some data that is valid in this snooping cache), the hit cache controller asserts the SHARED bus line 24. The requesting processor then marks the data block as "shared". If that requesting processor then writes to the block, it must write-through to invalidate all other copies of that block. However, if the SHARED bus line 24 was not asserted on the read, the data is marked as "only", and subsequent "writes" are not written through.

With the "shared" case, reading and writing data takes as many cycles as with the previously described write-back schemes. However, for the "non-shared" case, system 10 uses one less access of system bus 14. If no other cache 22 contained the requested data block, the requesting processor would mark the new data as "only". Then, when that processor 16 wrote to that block, it would not write it through. It would write to its cache only and not use another bus cycle.

The above-mentioned prior art systems read data in assuming that it is shared, and they always write it through once. In the present invention, system 10 knows if each data block is shared or not with inter-cache communication supplied by SHARED bus line 24, and it only writes through for the "shared" data. "Non-shared" data write-throughs are eliminated by using SHARED bus line 24.

The INV (Invalidate) bus line 26 also eliminates unnecessary bus accesses. Line 26 is also open-collector and is used during a write miss. If the first access to a data block is a write instead of a read, the data block may have to be read from global RAM 12 into cache 22 before it is written. If the size of the write is smaller than the block size (e.g. writing only a byte), the portion of the block that is not affected by the write must be read in first so the entire block in the cache will be correct. For example, if CPU 16 is executing a byte write, its cache 22 must first read in the entire block and then write the byte to CPU 16. If the block wasn't first read into cache 22, only the written byte, and not the entire block, would be valid in cache 22.

Since a write miss is really a read-write sequence, it could take two cycles of system bus 14. The first cycle would be used to read the data in, and the second cycle would be required to invalidate shared blocks. To eliminate this second access of system bus 14, the INV bus line 26 is used. INV bus line 26 is asserted during the read portion of the read-write sequence to invalidate any and all of the shared blocks. Then the "write" is written only to the requesting cache 22, and that block is set as "dirty".

The TCOMP (Transfer COMPlete) bus line 20 is utilized to signal that all receiving caches 22 have completed their snoop of the data transfer. For example, for every bus access, global RAM 12, as well as every cache snoop in the system 10, must assert the TCOMP signal to signal a complete transfer.

The SHARED bus line 24 and INV line 26 are used for coordination between the multiple caches 22. The INHIBIT line 18 is used for coordination between individual caches 22 and the global RAM 12. And the TCOMP line 20 is used system-wide to signal that all receiving units have completed the transfer. The cache controllers (e.g. 30, FIG. 2) associated with every processor 16 include logic to drive and receive the SHARED, INV, and TCOMP lines, and they include logic to drive the INHIBIT line. The RAM card 70 includes logic to receive the INHIBIT line 18 and to drive the TCOMP line 20. The INHIBIT bus line 18 is utilized to inhibit RAM card 70 from responding. The functions of lines 18 and 20 are described below in more detail regarding FIGS. 2 and 3.

Figure 2:
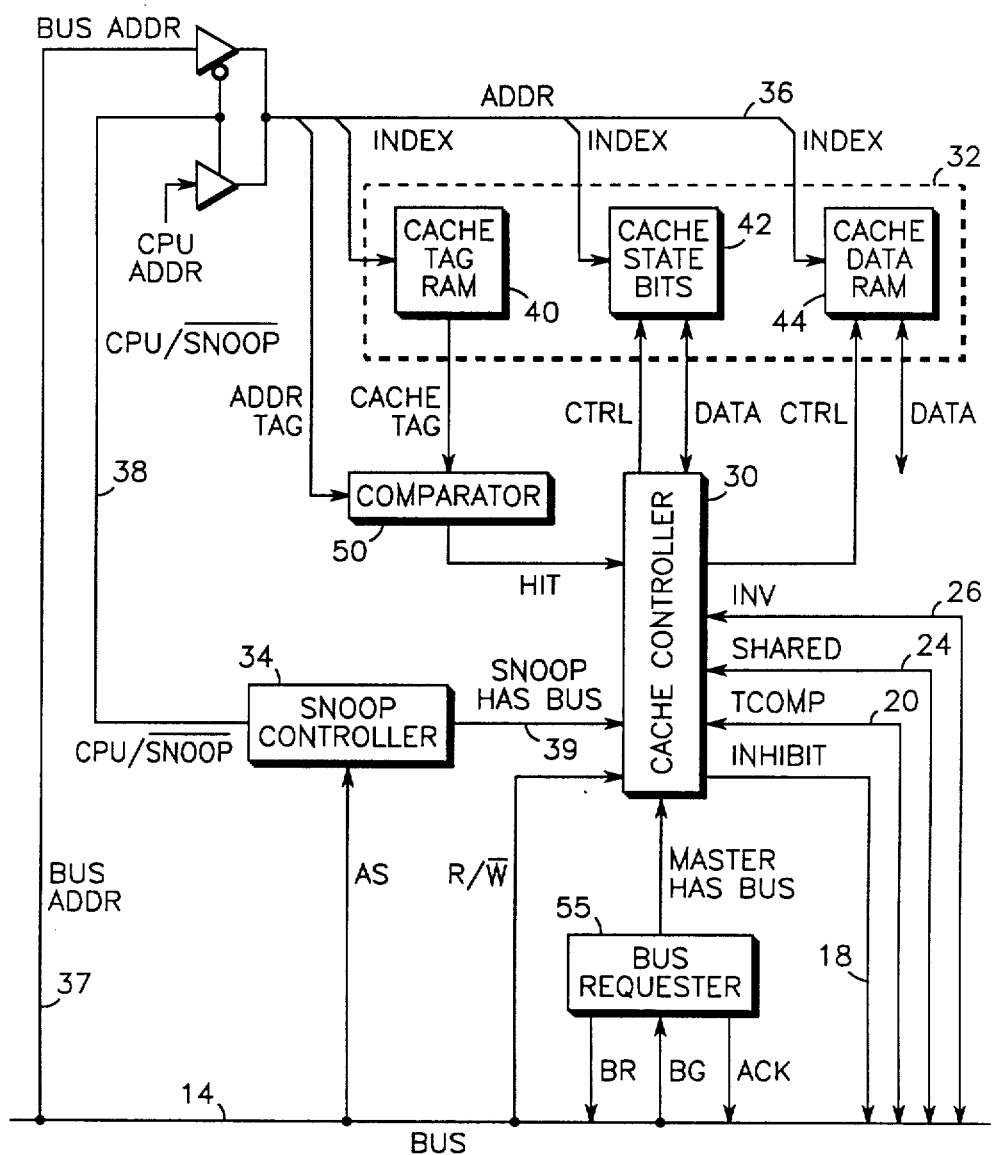
FIG. 2 is a block diagram illustrating the central processing unit (CPU) interface logic implemented in conjunction with the system of FIG. 1.

Referring specifically to FIG. 2, a block diagram of the logic associated with each CPU to interface to bus lines 18, 20, 24, and 26 is shown. Three major units of this logic are seen in FIG. 2; cache 32, cache controller 30, and snoop controller 34. Other sections of the CPU logic such as the processor, the standard bus interface, etc. are commonly known to those skilled in the art and therefore not shown in FIG. 2.

The cache logic units of cache 32 include cache tag RAM 40 which holds the upper half of the cached addresses, the cache state bits logic 42 which holds the 2 bits per block that denote what state the block is in, and the cache data RAM 44 which holds the cached data. For every address that comes into cache 32 on address line 36, the lower portion labeled the "index" addresses the cache logic units 40, 42, and 44. Comparator 50 has an input supplied from cache tag RAM 40 and another input supplied from the upper portion of address line 36. If these inputs match (i.e. the ADDR TAG matches the CACHE TAG), that access is valid in cache 32.

Cache controller 30 examines the cache state bits from logic circuit 42 for that block and takes appropriate action. For example, if the access is a "write-hit" and the state of the block is "only", cache controller 30 simply writes to cache 32. If the state of the block was "shared", cache controller 30 has to write to cache 32 and also write through to system bus 14.

Snoop controller 34 monitors the address strobe line (labeled "AS") on system bus line 14. When "AS" is asserted, that means that another CPU is accessing system bus line 14. Since all caches must snoop on the bus to maintain cache consistency, snoop controller 34 must run the "Bus Addr" lines through its cache for bus accesses by the other CPU's. To do this, snoop controller 34 disables the "CPU Addr" line and enables the "Bus Addr" line 37 onto the address line 36 by driving "CPU/Snoop" line 38 low. Snoop controller 34 also asserts the "snoop has bus" line 39 to notify cache controller 30 that the next cache access is a snoop.

When the "Bus Addr" "line has been enabled onto the "Addr" line 36, cache 32 is checked as described above. If the snoop "hits" in cache 32, cache controller 30 checks the cache state bits 42 of the hit block and again takes appropriate action. For example, if the hit is a "read shared", the cache controller 30 pulls the "SHARED" bus line 24 to notify the requesting CPU that is should cache that data item as "shared". If the "hit" cache block is "dirty", cache controller 30 asserts "INHIBIT" bus line 18 (to keep RAM 12 from responding) and then provides the "dirty" data itself. Finally, cache controller 30 would reset that block as "shared".

For every snoop, cache controller 30 asserts TCOMP bus line 20 to signal that it has completed the snoop. The requesting CPU will not complete its bus cycle until all other cache controllers (as well as global RAM 12) have asserted TCOMP. Bus requester 55 is used to notify CPU is the bus master, it does not snoop, and its does not assert TCOMP.

Figure 3:
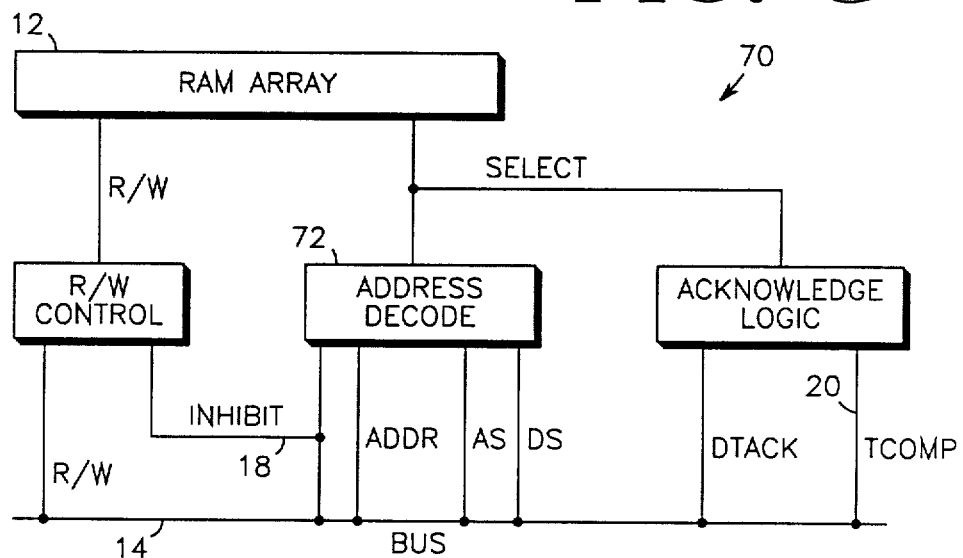
FIG. 3 is block diagram illustrating the RAM implemented in conjunction with the system of FIG. 1.

Referring specifically to FIG. 3, the RAM and associated logic 70 are shown in block diagram form. RAM logic 70 differs from ordinary RAM logic in that the "INHIBIT" bus line 18 is included in the "Address Decode" logic 72. If "INHIBIT" is asserted, RAM logic 70 must not respond, even if the address on system bus 14 correctly decodes to select RAM logic 70. Also, when the "INHIBIT" signal is asserted, it means that some cache controller is supplying previously "dirty" data to another cache. This data that is being asserted on system bus 14 must be written into global RAM 12, so that on the shared data in the caches will remain consistent in global RAM 12. To accomplish this "write", global RAM 12 holds off "TCOMP" while it writes the data that is asserted on system bus 14 to the appropriate address. Once the write is done, and that data block is consistent throughout the system, the RAM card 70 asserts "TCOMP", and the bus cycle is complete.

Also, for every normal bus cycle, the RAM logic 70 must assert TCOMP (along with the normal DTACK—data transfer knowledge) to notify that the transfer is complete.

In summary, the "write-shared" circuit of the present invention uses hardware to eliminate all non-essential bus accesses in a bus-based multiprocessor system employing private caches. By using extra bus lines for communication between cache controllers, the "write-shared" circuit dynamically determines whether data blocks are shared or private. Data blocks cached as private do not require an extra write-through to invalidate other like blocks in other caches. Since the bus utilization is lower, higher system performance is achieved, and more processors can be used on a single bus.

The Appendix provides the states and detailed state transitions for cache accesses and snoop accesses for the "write-shared" circuit of the present invention.

Through the descriptions of the figures an improved cache circuit for multiprocessor systems has been disclosed. Further modifications and improvements of the circuit will occur to those skilled in the art. I desire it to be understood, therefore, that this invention is not limited to the particular form shown, and I intend in the appended claims to cover all modifications which do not depart from the spirit and scope of this invention.

APPENDIX

STATES:

| | |
|---|---|
| Invalid - | RAM is not in the cache. |
| Shared - | RAM has been read to cache and was only, shared, or dirty in another cache. |
| Only- | RAM has been read to cache and it is the only cached copy. |
| Dirty- | Cache has been written and is now different than the RAM copy. |

Internal:

| | |
|---|---|
| Replacement | Invalid, only, or shared - simply write over block; dirty - write back to RAM, then write over. |
| Read Invalid (or miss) | Read whole block from RAM, if SHARED asserted, set shared; if SHARED unasserted, set only. |
| Write Invalid | Read whole block from RAM and assert INV, write to cache, set dirty. |
| Read Shared | Read from cache, leave shared. |
| Write Shared | Write to RAM and cache, set only. |
| Read Only | Read from cache, leave only. |
| Write Only | Write to cache, set dirty. |
| Read Dirty | Read from cache, leave dirty |
| Write dirty | Write to cache, leave dirty. |

Cache Snoop:

| | |
|---|---|
| Read Invalid (or miss) | Do nothing. |
| Write Invalid (or miss) | Do nothing. |
| Read Shared | Assert SHARED, leave shared. |
| INV & Read Shared | Assert SHARED, set invalid. |
| Write Shared | Set Invalid. |
| Read Only | Assert SHARED, set to shared. |
| INV & Read Only | Assert SHARED, set invalid. |
| Write Only | Not possible. |
| Read Dirty | Inhibit RAM (by asserting INHIBIT), provide data and DTACK, assert SHARED, set shared; data is also written to RAM (so the copy is valid in RAM as well). |
| INV & Read Dirty | Same as above but set invalid. |
| Write Dirty | Not possible |

What is claimed is:
1. A multiprocessor system comprising:
   a random access memory (RAM);
   a plurality of central processing units (CPU's);
   a plurality of cache memories, one of said cache memories being coupled to each of said plurality of CPU's;
   a plurality of logic means for coordinating data transfer, one of said logic means being coupled to each of said plurality of cache memories;
   a system bus to which said RAM, said plurality of CPU's, and said plurality of cache memories are coupled, said system bus enabling address and data information to be exchanged among said RAM, said plurality of CPU's, and said plurality of cache memories;
   a first signal line to which each of said plurality of logic means is coupled;
   a first one of said plurality of logic means, being coupled to a first cache memory of said plurality of cache memories, comprising means for monitoring said system bus to determine whether a data block being read by a CPU coupled to a second cache memory of said plurality of cache memories is contained in said first cache memory and, if so, generating a first signal level on said first signal line, and otherwise generating a second signal level on said first signal line; and a second one of said plurality of logic means, being coupled to said second cache memory, comprising means for enabling said CPU coupled to said second cache memory, if it subsequently performs a write operation to a data block in said second cache memory, to write the data in said data block through to said RAM if said first signal level is present on said first signal line, and for inhibiting said CPU from writing said data through to said RAM if said second signal level is present on said first signal line, whereby said CPU coupled to said second cache memory is inhibited from using said system bus when it performs a write operation on said data block in said second cache memory, if said data block is not contained in said first cache memory, thereby reducing traffic on said system bus.

2. A multiprocessor system comprising:

a random access memory (RAM);

a plurality of central processing units (CPU's);

a plurality of cache memories, one of said cache memories being coupled to each of said plurality of CPU's;

a plurality of logic means for coordinating data transfer, one of said logic means being coupled to each of said plurality of cache memories;

a system bus to which said RAM, said plurality of CPU's, and said plurality of cache memories are coupled, said system bus enabling address and data information to be exchanged among said RAM, said plurality of CPU's, and said plurality of cache memories;

a signal line (TCOMP) to which each of said plurality of logic means is coupled;

a first one of said plurality of logic means, being coupled to a first cache memory of said plurality of cache memories, comprising means for monitoring said system bus to determine whether a data block being accessed from said RAM by a CPU coupled to a second cache memory of said plurality of cache memories is contained in said first cache memory, said first one of said logic means comprising means for generating a first signal level on said signal line while said first one of said logic means is determining whether said data block is contained in said first cache memory, and otherwise generating a second signal level on said signal line; and logic means coupled to said RAM comprising means for preventing said RAM from completing said access to said data block by said CPU coupled to said second cache memory if said first signal level is present on said signal line, and for enabling said RAM to complete said access to said data block if said second signal level is present on said signal line, whereby said RAM does not complete said access to said data block until said first one of said logic means has determined whether said data block is contained in said first cache memory.

3. A multiprocessor system comprising:

a random access memory (RAM);

a plurality of central processing units (CPU's);

a plurality of cache memories, one of said cache memories being coupled to each of said plurality of CPU's;

a plurality of logic means for coordinating data transfer, one of said logic means being coupled to each of said plurality of cache memories;

a system bus to which said RAM, said plurality of CPU's, and said plurality of cache memories are coupled, said system bus enabling address and data information to be exchanged among said RAM, said plurality of CPU's, and said plurality of cache memories;

a signal line (INHIBIT) to which said RAM and each of said plurality of logic means is coupled;

a first one of said plurality of logic means, being coupled to a first cache memory of said plurality of cache memories, comprising means for monitoring said system bus to determine whether a data block being read by a CPU coupled to a second cache memory of said plurality of cache memories is stored in said first cache memory and differs from the corresponding data block stored in said RAM, and, if so, for generating a first signal level on said signal line and transmitting said data block stored in said first cache memory to said second cache memory, and otherwise generating a second signal level on said signal line; and RAM logic means coupled to said RAM and to said signal line, for inhibiting said RAM from transmitting said data block to said CPU coupled to said second cache memory and for causing said data block which is stored in said first cache memory to be written to said RAM, if said first signal level is present on said signal line, even though said CPU coupled to said second cache memory is asserting that said data block is identified in said RAM and said first and second cache memories.

4. A multiprocessor system comprising:

a random access memory (RAM);

a plurality of central processing units (CPU's);

a plurality of cache memories, one of said cache memories being coupled to each of said plurality of CPU's;

a plurality of logic means for coordinating data transfer, one of said logic means being coupled to each of said plurality of cache memories;

a system bus to which said RAM, said plurality of CPU's, and said plurality of cache memories are coupled, said system bus enabling address and data information to be exchanged among said RAM, said plurality of CPU's, and said plurality of cache memories;

a signal line (INVALID) to which each of said plurality of logic means is coupled;

a first one of said plurality of logic means, being coupled to a first cache memory of said plurality of cache memories, comprising means for monitoring said system bus to determine whether a data block being written to during a WRITE cycle by said CPU coupled to said first cache memory is contained in said first cache memory and, if so, generating a first signal level on said signal line, and, if not, for generating a second signal level on said signal line and initiating a system bus READ cycle to enable said data block to be read from said RAM into said first cache memory and, after said system bus READ cycle has been completed, for completing said WRITE cycle by enabling said CPU to write to said data block only in said first cache memory; and a second one of said plurality of logic means, being coupled to a second cache memory of said plurality of cache memories, comprising means for monitoring said system bus to determined whether said data block is contained in said second cache memory, and, if so, for setting said data block to invalid in said second cache memory, if said second signal level is present on said signal line, whereby a WRITE cycle takes only 1 bus cycle rather than 2 bus cycles for said CPU coupled to said first cache memory to read said data block into said first cache memory and to indicate that said data block in said second cache memory should be invalidated.

5. In a data processing system comprising a system bus, a signal line for providing a shared signal, a random access memory (RAM) coupled to said system bus and storing information, a plurality of processors coupled to said system bus and requiring read/write access to said information in said RAM over said system bus, a plurality of cache memories each coupled to a one of said plurality of processors, logic means for coordinating information transfer coupled to said system bus, to said signal line, and to said plurality of cache memories, a method of reducing accesses to said RAM over said system bus by said plurality of processors, said method comprising the steps of:

determining, by means of said logic means, whether information stored in one of said plurality of cache memories is valid and requested by one of said plurality of processors not coupled to said one cache memory, and, if so, identifying said information as "shared" via a shared signal on said signal line, but otherwise not identifying said information as "shared"; and enabling said one processor to write said information through to said RAM if said one processor subsequently modifies said information in a second cache memory of said plurality of cache memories, if said information stored in said one cache memory is identified as "shared", otherwise inhibiting said one processor from writing said information through to said RAM.

* * * * *

UNITED STATES PATENT AND TRADEMARK OFFICE
CERTIFICATE OF CORRECTION

PATENT NO. : 4,959,777

DATED : September 25, 1990

INVENTOR(S) : Thomas H. Holman Jr.

It is certified that error appears in the above-identified patent and that said Letters Patent is hereby corrected as shown below:

Column 8, line 11, claim 3, delete --is-- and insert "are".

Column 8, line 34, claim 3, delete --identified-- and insert "identical".

Column 8, line 59, claim 4, after --so,-- insert "for".

Column 9, line 4, claim 4, delete --determined-- and insert "determine".

Signed and Sealed this

Tenth Day of March, 1992

Attest:

HARRY F. MANBECK, JR.

*Attesting Officer*   Commissioner of Patents and Trademarks